United States Patent [19]

Trimmer

[11] Patent Number: 4,652,373

[45] Date of Patent: Mar. 24, 1987

[54] TUBESHEET FOR SPIRAL WOUND HOLLOW FIBER PERMEATOR

[75] Inventor: Johnny L. Trimmer, Antioch, Calif.

[73] Assignee: The Dow Chemical Company, Midland, Mich.

[21] Appl. No.: 831,681

[22] Filed: Feb. 21, 1986

[51] Int. Cl.$^4$ ............................................. B01D 13/00
[52] U.S. Cl. ............................. 210/321.1; 210/433.2; 210/450
[58] Field of Search ............... 210/321.1, 321.2, 321.3, 210/433.2, 450

[56] References Cited

U.S. PATENT DOCUMENTS 4,080,296 3/1978 Clark ........................... 210/321.1 X Primary Examiner—Frank Spear

[57] ABSTRACT

A hollow fiber reverse osmosis permator separation unit capable of producing over 100,000 gallons per day of processed water. The hollow fibers are spirally wound on a hollow core creating a bundle of fiber lengths. Each of the fiber lengths pass through a tubesheet which is drilled with a hole pattern that cuts through all of the hollow fibers.

10 Claims, 6 Drawing Figures

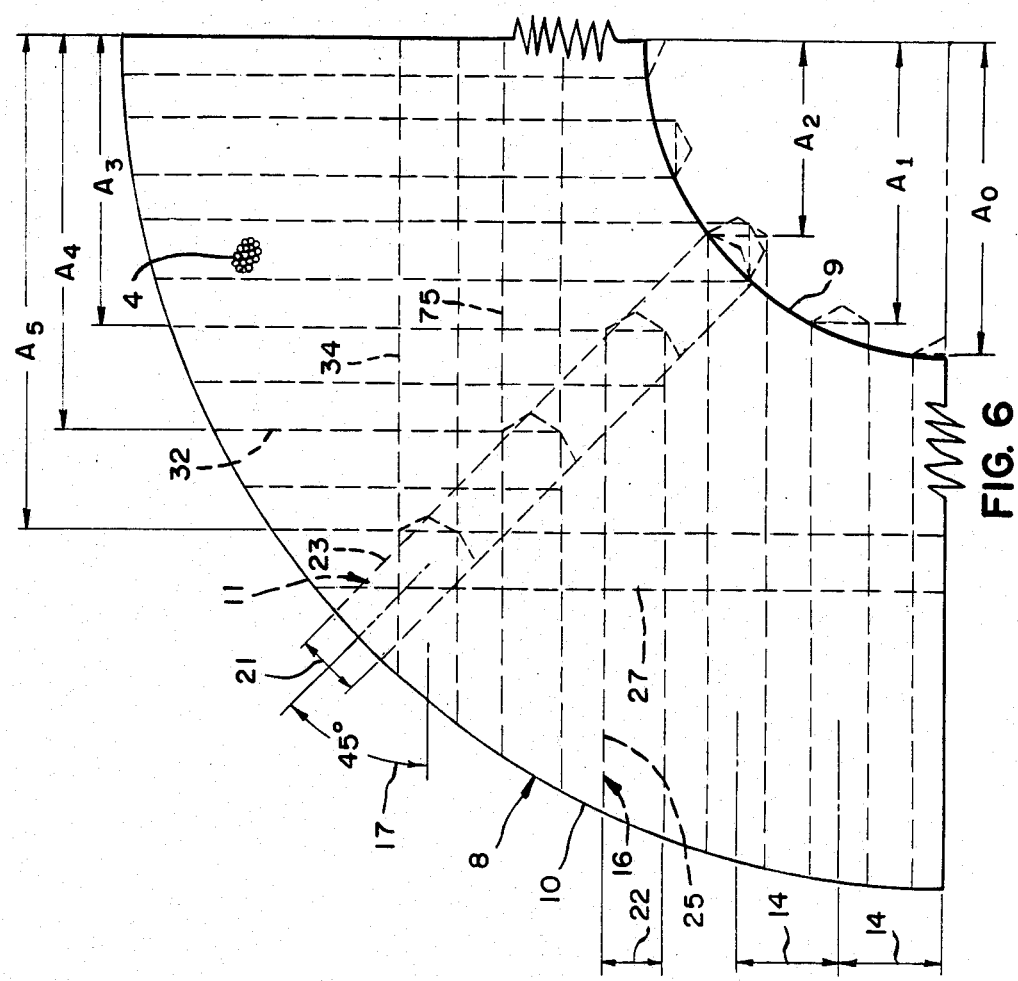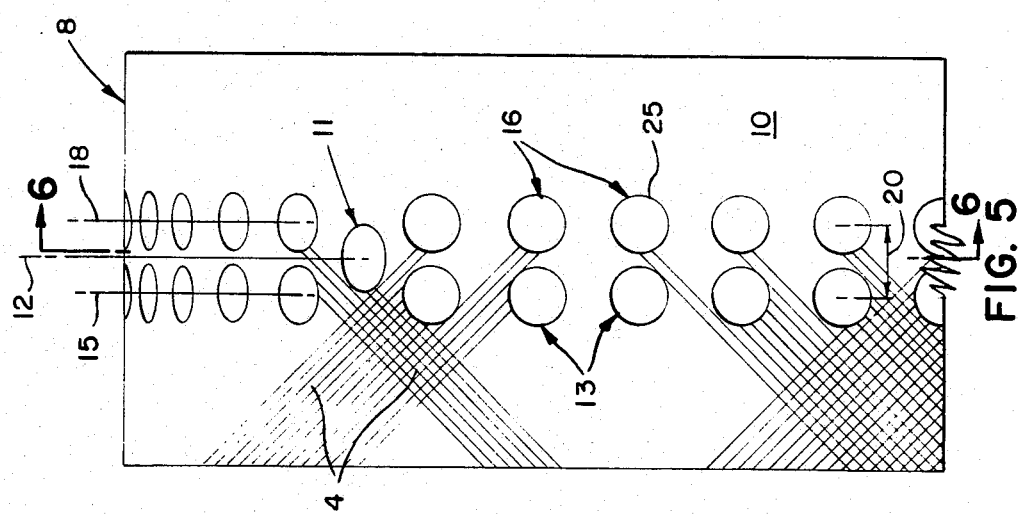

TUBESHEET FOR SPIRAL WOUND HOLLOW FIBER PERMEATOR

BACKGROUND OF THE INVENTION

This invention relates to permeability separation devices (permeators) in which the membrane is formed from selectively permeable, hairlike, hollow fiber lengths. These permeators are particularly suited for the recovery of water from brines by reverse osmosis, but specific membranes have the propery of being selectively permeable to different components of fluid mixtures. When pressure is applied to the solution, solvent (permeate) is forced through the membrane while the ions are restrained from passing therethrough. The permeate is separated from the feed and processed feed by potting the ends of the hollow fibers in a resinous wall commonly referred to as a tubesheet and either permitting the ends of the hollow fibers to extend through the tubesheet or cutting the resinous tubesheet and thereby exposing the open ends of the hollow fibers. Such tubesheets are disclosed in McLain U.S. Pat. No. 3,422,008, Clark, U.S. Pat. No. 4,358,377 and Tomsic, U.S. Pat. No. 3,503,515. The problem with such tubesheets is that some structural system must be used to retain the tubesheet in the pressure vessel. One method is to provide a porous backup plate butted against the open ends of the hollow tubes. This construction, however, results in plugging the ends of a great many of the hollow fibers and reducing the efficiency of the permeator. Another system is to enlarge the size of the tubesheet and then provide special couplings to retain the tubesheet. This, however, increases the complexity of the device and raises the cost.

Another method of collecting the permeate from the hollow fibers is disclosed in Clark, U.S. Pat. Nos. 4,061,574 and 4,080,296. In both of these Clark patents bores are drilled along chords into the tubesheet thus eliminating the need for end plates. In U.S. Pat. No. 4,061,574, Clark suggested that the holes might be bored along radial lines, but recognized that many of the hollow fibers would not be intersected and such a pattern of bores would be inefficient. The permeators in both Clark patents required forming an annular groove in the peripheral wall of the tubesheet. This is difficult in practice to achieve since many of the open ends of the hollow fibers are mashed closed in the process of forming the groove. Further, both of the Clark patents call for all the bores to be parallel and along a single chord. It has been difficult in practice to bore holes in the circular tubesheet as the angle between the center line of the bore and a line tangent to the circumference increases. As a result, some of the ends of the hollow fibers are sealed closed in the process of boring holes into the tubesheet and the efficiency of the tubesheet is accordingly decreased.

As the size of the permeators has increased the losses in permeators with uncut fibers has become a matter of practical concern.

The primary object of the present invention is to provide a tubesheet for a permeator in which all of the hollow fibers are free to discharge permeate without restriction.

Another object is to provide an improved tubesheet in which the permeate may drain to either a core within the tubesheet or to a location on the outer periphery of the tubesheet.

A further object is to provide an improved tubesheet in which all of the hollow fibers are intersected with a minimum number of bore holes.

Still another object is to provide a system for drilling bores in which all holes may be drilled at a relatively small angle to the surface of the tubesheet.

A still further object is to provide a tubesheet in which the bores have a relatively small diameter.

A final object is to provide a tubesheet which may be used in a pressure balanced system such as the permeator disclosed in U.S. Pat. No. 4,080,296 or a nonpressure balanced permeator such as the one disclosed in U.S. Pat. No. 4,358,377.

SUMMARY DESCRIPTION OF THE DRAWINGS

FIG. 1 is a longitudinal sectional view of a permeator using the improved tubesheet of the present invention. A hollow fiber is helically wound upon a core forming an elongated bundle. The bundle is enclosed in a casing capable of withstanding high pressure and conduits are provided for the entry of feed fluid and the egress of permeate and processed feed fluid.

FIG. 5 is an enlarged side view of a quarter section of the tube sheet of the present invention.

FIG. 6 is cross sectional view of the portion of the tubesheet shown in FIG. 5 taken generally along line 6—6 of FIG. 5.

SUMMARY OF THE INVENTION

Figure 1:
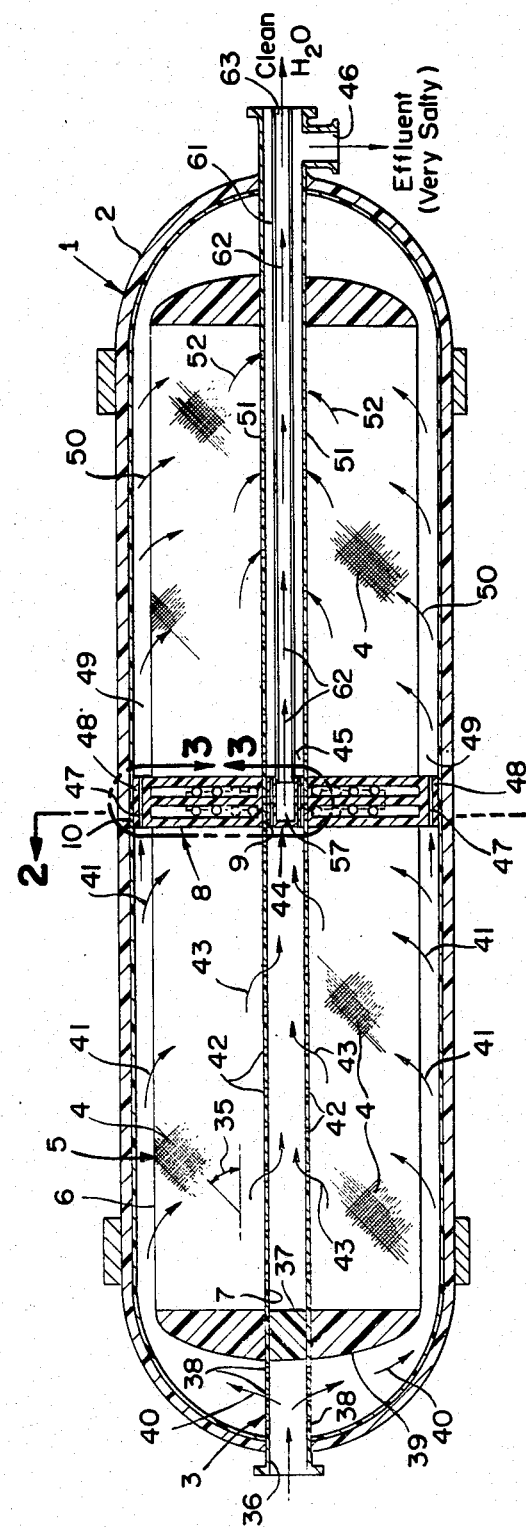

Broadly, the present invention may be defined as an improved hollow fiber permeator separation apparatus having a pressurizeable casing, comprising:

a. an elongated foraminous hollow core member mounted in said casing;

b. a fluid permeable hollow fiber member, a plurality of hollow fibers, or a a tow of hollow fibers helically wound upon and extending along a longitudinal portion of said core member forming a plurality of hollow fiber longitudinally extending length portions in a plurality of radial layers;

c. said helically wound hollow fiber member lengths forming a longitudinally extending bundle having an outer peripheral surface and defining an inner surface;

d. a radial tubesheet surrounding said core member and sealingly engaging a longitudinal portion of each of said longitudinally extending length portions of said hollow fiber member and extending radially inwardly of said inner surface of said bundle forming an inner tube sheet surface and extending radially outwardly from said outer peripheral surface of said bundle defining an outer tubesheet surface;

e. a manifold bore means extending radially through said core member and said tubesheet to said outer tubesheet surface, the axis of said manifold bore means lying within a first plane which is generally perpendicular to the central axis of said core member;

f. first collector bore means bored at spaced intervals from said outer tubesheet surface along chords into said tubesheet in a second plane parallel and closely adjacent to said first plane;

g. second collector bore means bored at said spaced intervals from said outer tubesheet surface along chords into said tubesheet in a third plane parallel and closely adjacent to said first plane;

h. a first tributary bore means connecting said manifold bore means and said first collector bore means and the axis of said first tributary bore means lying generally within said second plane;

i. a second tributary bore means connecting said manifold bore means and said second collector bore means and the axis of said second tributary bore means lying generally within said third plane;

j. said collector bore means have a diameter which is generally 9/16's of the length of said intervals between said collector bore means along said outer tubesheet surface;

k. the distance between said first and second collector bore means is generally 11/16ths of the length of said intervals between said collector bore means along said outer tubesheet surface; and l. the diameter of said first manifold bore means is generally equal to or greater than the diameter of said collector bore means.

In another less preferred form of the invention, the tubesheet may be mounted and drilled so that the permeate is directed to the periphery of the tubesheet rather than to the inner wall of the tubesheet. It is to be understood that the tubesheet of the present invention may be used where there is one or more tubesheets in the permeator and in permeators that are arranged so that the pressure against the tubesheet is balanced or unbalanced.

DETAILED DESCRIPTION OF THE EMBODIMENTS OF THE INVENTION

Referring to the drawings a hollow fiber permeator separation apparatus 1 is illustrated in FIG. 1 having a pressurizeable casing 2, the improvement consists briefly of:

a. an elongated foraminous hollow core member 3 mounted in a casing 2;

b. a fluid permeable hollow fiber member 4, a plurality of hollow fibers, or a plurality of hollow fibers wound in a single or plurality of tows helically wound upon and extending along a longitudinal portion of the core member forming a plurality of hollow fiber longitudinally extending length portions in a plurality of radial layers;

c. the helically wound hollow fiber member lengths form a longitudinally extending bundle 5 having an outer peripheral surface 6 and defining an inner surface 7;

d. a radial tubesheet 8 surrounding the core member and sealingly engaging a longitudinal portion of each of the longitudinally extending length portions of the hollow fiber member and extending radially inwardly of the inner surface of the bundle forming an inner tubesheet surface 9 and extending radially outwardly from the outer peripheral surface of the bundle forming an outer tubesheet surface 10;

e. a manifold bore means 11 extending radially through core member 3 and the tubesheet 8 to the outer tubesheet surface 10, the axis of the manifold bore means 11 lying within a first plane 12 which is generally perpendicular to the central axis of the core member;

f. first collector bore means 13 bored at spaced intervals 14 from the outer tubesheet surface along chords into the tubesheet in a second plane 15 parallel and closely adjacent to the first plane;

g. second collector bore means 16 bored at the spaced intervals 14 from the outer tubesheet surface along chords into the tube sheet in a third plane 18 parallel and closely adjacent to the first plane;

h. a first tributary bore means 19 connecting the manifold bore means 11 and the first collector bore means 13 and the axis of the first tributary bore means lying generally within the second plane 15;

i. a second tributary bore means (not shown) connecting the manifold bore means 11 and the second collector bore means 16 and the axis of the second tributary bore means lies generally within a third plane 18;

j. the first and second collector bore means 13 and 16 have diameters which are generally 9/16's of the length of the intervals 14 between the collector bore means along the outer tubesheet surface 10;

k. the distance 20 between the first and second collector bore means 13 and 16 is generally 11/16ths of the length of the intervals 14 between the first and second collector bore means along the outer tubesheet surface 10; and l. the diameter 21 of the first manifold bore means 11 is generally equal to or greater than the diameter 22 of the first and second collector bore means 13 and 16.

Figure 2:
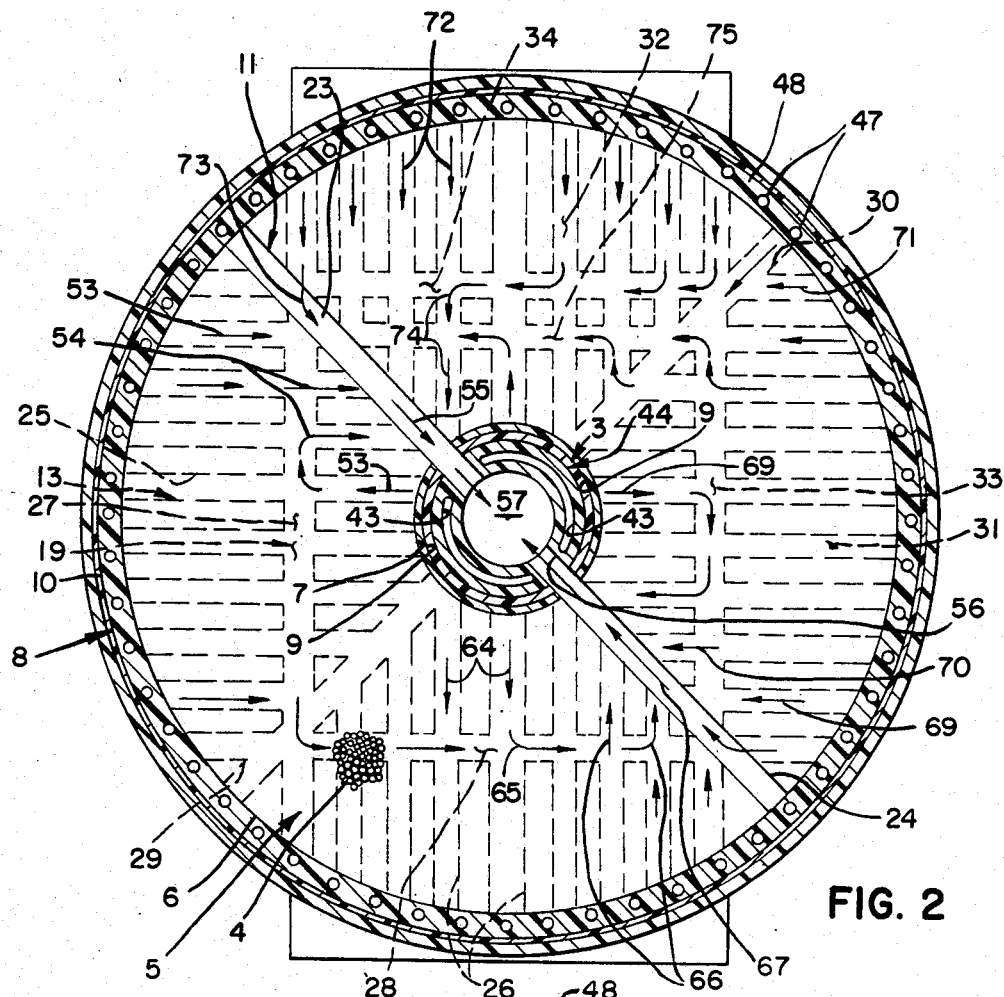
FIG. 2 is a cross sectional view of the tubesheet taken along line 2—2 of FIG. 1.

Referring to FIG. 2, the manifold bore means 11 includes first and second manifold bores 23 and 24 coaxial to one another and disposed on opposite sides of the hollow core member 3.

The first and second collector bore means 13 and 16 which are bored in second and third planes 15 and 18 each include a first plurality of collector bores 25 and a second plurality of collector bores 26 disposed at generally right angles to said first plurality of collector bores.

Each of the first and second tributary means includes a first tributary bore 27 which intersects a plurality of the first collector bores 25, and a second tributary bore 28 which intersects a plurality of the second collector bores 26.

The manifold bore means 11 may further include third and fourth manifold bores 29 and 30 which are coaxial to one another and disposed on opposite sides of the hollow core member 3 and extend along a radius within the tubesheet along the first plane 12 from the outer tubesheet surface 10 and terminate at the inner tubesheet surface 9 and are disposed at generally right angles to the first and second manifold bores 23 and 24.

The first and second collector bore means may also include a third plurality of collector bores 31 generally parallel to the first plurality of collector bores 25 disposed on opposite sides of the core member 3, and a fourth plurality of collector bores 32 generally parallel to the second plurality of collector bores 26 disposed on opposite sides of the core member.

The first and second tributary bore means each may include a third tributary bore 33 which intersects a plurality of the third collector bores 31, and a fourth tributary bore 34 which intersects a plurality of the fourth collector bores 32.

The first and second collector bore means may be disposed to the manifold bore means 11 at an angle 17 of substantially 45°.

As illustrated in FIG. 2 the first plurality of collector bores 25 extend from the outer tube sheet surface 10 of the tubesheet to an inner termination point which is first to intersect the inner surface 7 of the bundle, or to intersect and communicate with the first or third manifold bores 23 or 29.

The second plurality of collector bores 26 extend from the outer tubesheet surface 10 of the tubesheet to an inner termination point which is first to intersect the inner surface 7 of the bundle, or to intersect and communicate with the third or second manifold bores 29 or 24. The third plurality of collector bores 31 extend from the outer tubesheet surface 10 of the tubesheet to an inner termination point which is first to intersect the inner surface 7 of the bundle, or to intersect and communicate with the second or fourth manifold bore 24 or 30.

The fourth plurality of collector bores 32 extend from the outer tubesheet surface 10 of the tubesheeet to an inner termination point which is first to intersect the inner surface 7 of the bundle, or to intersect and communicate with the fourth or first manifold bores 30 or 23.

Each of the tributary bores 27, 28, 33, and 34 are disposed coaxially with a collector bore and intersect adjacent manifold bores.

Each of the first collector bores 25 which intersect the third manifold bore 29 is preferably located so as to intersect one of the second collector bores 26 which intersect the third manifold bore 29, and each of the first collector bores 25 which intersect the first manifold bore 23 is located so as to intersect one of the fourth collector bores 32 which intersect the first manifold bore 23.

It has been found that the hole pattern of the present invention intersects every collector bore when the hollow fiber member plurality of hollow fibers or fiber tows are helically wound upon the core member at a helix angle 35 varying from approximately 36° to about 54°.

In the permeator just described, the permeate exits the tubesheet through the hollow core member 3. In another form of the invention which is not illustrated, the permeate could exit the tubesheet at the periphery of the tubesheet by cutting an annular slot in the outer tubesheet surface so that one or more manifold bores were in intersecting communication with the slot. A ring cap would also be required to surround the groove. Since as previously stated, it is difficult to cut such an annular groove without plugging the hollow fiber members this method is less preferred.

Figure 3:
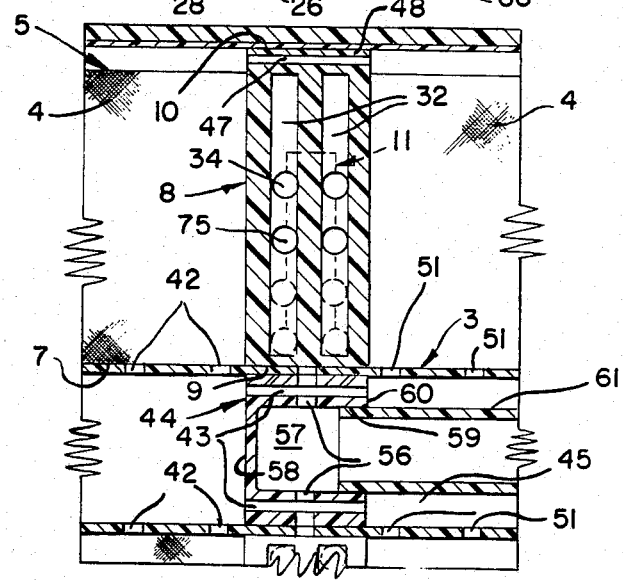
FIG. 3 is an enlarged scale partial longitudinal sectional view of the tubesheet portion of the permeator shown in FIG. 1.

FIGS. 1-3 illustrate a permeator in which the tubesheet of the present invention may be used. The permeator illustrated is similar to the permeator disclosed in Clark U.S. Pat. No. 4,080,296 except that the hollow fiber member is wound on the core member helically and the feed water is directed first to the outer surface of the bundle instead of initially through the hollow core. McLain, U.S. Pat. No. 3,422,008 discloses a permeator with the hollow fiber wound helically on a core. The permeator illustrated may be constructed using a similar spiral winding process.

The hollow fiber member may be made of cellulose triacetate and produced as taught by Clark and McLain (supra) and by many others in the field. Tomsic, U.S. Pat. No. 3,503,515 states that the hollow fibers may be made from polymers of olefins, amides, silicones, ethers, nitriles, sulfides and the like and have an outside diameter of 10-250 microns and a wall thickness of 2-75 microns.

Clark, U.S. Pat. No. 3,422,008 teaches that cellulose triacetate fibers may have an outside diameter of 110-120 microns and an inside diameter of 90 microns. Bundles of these fibers may be 24 inches in diameter by 8 feet long. Operating pressures of 250-400 psig for brackish water and 800 psig mimimum for sea water are common. These parameters may be used in constructing the permeator of the present invention.

The tubesheet and spiral winding of the hollow fiber may be effected as taught in McLain U.S. Pat. No. 3,422,008 by the use of an apparatus which rotates the hollow core and winds the hollow fiber in a spiral path. As the core is rotated, a solution of resinous material is applied over the fibers by a spray applicator. The tubesheet may be made from an epoxy resin which, as taught by McLain U.S. Pat. No. 3,422,008, consists of 14.7 parts of the diglycidyl ether of bisphenol, 6.8 parts of soya-1,3-propylene diamine and 1.1 parts of dimethylaminopropylamine.

The bores in the tubesheet may be drilled as taught in Clark U.S. Pat No. 4,061,574 using a water-lubricated twist drill while the assembly is locked in an appropriate jig.

The operation of the permeator illustrated is as follows: Feed, such as brackish or sea water is fed through opening 36 in the core member 3. A plug 37 in the core member causes the feed to flow through openings 38 in the foraminous core and to flow around resinous wall member 39 (which holds the ends of the hollow fiber lengths) to the outside of the bundle as shown by arrows 40. A similar resinous wall member holds the other ends of the hollow fiber lengths. The feed then enters the bundle as shown by arrows 41 Feed fluid which does not permeate the walls of the hollow fibers re-enters the foraminous core member through openings 42 as shown by arrows 43, downstream of plug 37. The effluent continues through openings 43 in connecting block 44 illustrated in FIG. 4. After passing through the connecting block, the effluent continues through the core member 3 in annular channel 45 and exits the permeator through opening 46.

Feed fluid also passes through bores 47 in annular band 48 which is bonded to the tubesheet. The bores 47 may also be bored through the tubesheet if it is formed sufficiently radially outwardly from the bundle of hollow fibers. Feed water which passes into the opening 49 between the casing 2 and the right half of the fiber bundle 5 enters the bundle as shown by arrows 50. Feed which does not permeate the walls of the hollow fibers re-enters the foraminous core 3 through openings 51 as shown by arrows 52 and joins the previous effluent fluid in annular channel 45.

The portion of the feed which permeates the walls of the hollow fibers through either the right or left side of bundle 5 flows toward the tubesheet 8 and exits the hollow fibers 4 through collector bore means 13 or 16 in the manner illustrated in FIGS. 2 and 5. As shown in FIG. 5, collector bore means 13 and 16 are bored into the tubesheet along parallel spaced planes 15 and 18. In the interests of brevity, the network of bores is illustrated only in plane 15 which is depicted in FIG. 2. The description of the flow of permeate through the collector bore means 16 in plane 18 is identical as described below for the flow of permeate through collector bore means 13 in plane 15.

Figure 4:
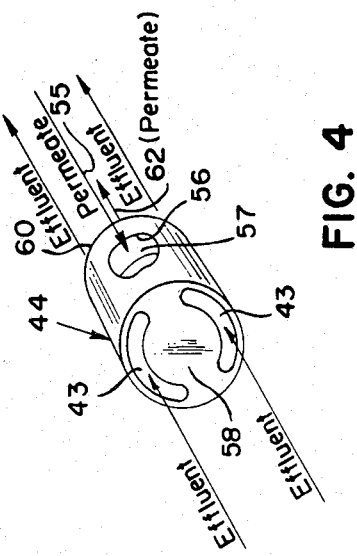
FIG. 4 is a perspective view of the connecting block.

As previously described, the collector bore means 13 is made up of first, second third and fourth collector bores 25, 26, 31 and 32. Permeate flowing through first collector bores 25 flows in the directions shown by arrows 53 toward first tributary bore 27 and then follows a first collector bore which intersects and communicates with first manifold bore 23 as shown by arrows 54. Permeate in the first manifold bore flows in the direction of arrow 55 through opening 56 in connecting block 44 and into chamber 57 in the connecting block. Connecting block 44 shown in detail in FIG. 4 is located in core member 3 and located in the plane of the tubesheet as illustrated in FIGS. 1 and 2. As shown in FIG. 4, connecting block 44 is closed at end 58 and opening 59 at block end 60 communicates with chamber 57 to carry the permeate to permeate tube 61 which is located within a portion of hollow core member 3. Permeate flows in the direction shown by arrows 62 and exits through opening 63 in permeate tube 61.

Referring again to FIG. 2, second collector bores 26 intersect the hollow fiber members 4 and permeate flows in the direction shown by arrows 64 into second tributary bore 28 and flows in the direction shown by arrows 65 directly into second manifold bore 24 or through second collector bores which intersect the second manifold bore as shown by arrows 66. Permeate flowing through second manifold bore as shown by arrows 67 flows through opening 56 in connecting block 44 and then into chamber 57 in the connecting block.

The hollow fiber members intersected by third collector bores 31 collect permeate therefrom which then flows in the direction of arrows 69 to third tributary bore 33. A portion of the permeate flows directly into second manifold bore 24, a portion flows through third collector bores which intersect with manifold bore 24 as shown by arrows 70 and some of the permeate flows either into the fourth collector bores 32 or the fourth tributary bore as shown by arrows 71.

The hollow fiber members intersected by fourth collector bores 32 collect permeate which then flows in the direction of arrows 72 into fourth tributary bore 34 which carries the permeate as shown by arrows 73 into first manifold bore or through fourth collector bores and then to first manifold bore as shown by arrows 74.

To effect even more rapid permeate flow through the tubesheet, additional tributaries may be bored such as additional fourth tributary 75 which is parallel to fourth tributary 34 and intersects fourth collector bores 32 and first manifold bore 23 and fourth manifold bore 30.

Referring to FIGS. 5 and 6, the dimensions have been computed for preventing an automatic drill from punching the center core member. As an example, if the core member radius RO is 3", the interval 14 between collector bores is 1", and the diameter of the collector bore 22 is 1", then A0=2.987, A1=2.713", A2=1.984, A3=2.719, A4=3.719", and A5=4 719".

It should be noted that FIG. 6 illustrates the pattern of bore holes represented by collector bore means 16 whereas FIG. 2 represents the pattern of bore holes represented by collector bore means 13. As may be seen from the drawing, the pattern is identical and the same numbering of like parts has therefore been given.

Permeators using the teachings of the present invention may be of various sizes. The diameter may be built up of many layers. As an example, the permeator may have 60 layers of hollow fiber members at a 45 degree angle wrap.

To test whether each of the fiber members 4 would in fact be intersected by a collector bore if the hole pattern was bored in accordance with the present invention, a computer simulation of a spiral wound hollow fiber tubesheet was conducted on an Apple 11 computer. In the computer simulation, as each stand of fiber approached the pattern of holes, closely spaced points of the strand were calculated and plotted. When a strand entered a hole, plotting of that strand was stopped and the procedure repeated for the next strand. This process was continued until 50 degrees of the layer of wrap was calculated and plotted. Plots of other layers were superimposed on the first layer until the outside layer was done. This whole procedure was repeated for helix angles varying from 36° to 54° in 1.5° increments. It was found that all of the fibers entered a hole. Sixty layers of fibers were plotted and none of the fibers plotted continued past the second row of holes.

In a test of a module using the hole pattern of the present invention, the results came very close to the theoretical calculated results for a test module. In the test, the fiber member had a water flux (gallons/ft$^2$) or Kw of 0.0301 gal/ft$^2$ psi with a salt passage Sp of 0.0176. The Active fiber length L equaled 160 cm. and the inactive fiber length Ls equaled 8.5 cm. The active surface area of the fiber A in the module was 18,449.7 ft$^2$ for a module with an outside diameter of 303.10$^{-6}$ m and a total fiber length l of 5,907,600 ft. (excluding the tubesheet). Because fibers have finite length and finite flow through the lumen, there is a pressure drop through the length of the fiber that decreases its effectiveness in permeating water. This efficiency of the fiber for the present example is calculated to be 0.831. In the test, the average brine concentration was 800 ppm. The calculated water flux for the present module was 108,510 gallons per day and the actual flux was 108,125 gallons per day. The theoretical salt rejection at 65% recovery was 95.96% and the actual rejection was 95.9%.

I claim:
1. In a hollow fiber permeator separation apparatus having a pressurizeable casing, the improvement comprising:
   a. an elongated foraminous hollow core member mounted in said casing;
   b. a fluid permeable hollow fiber, a plurality of hollow fibers, or a tow of hollow fibers helically wound upon and extending along a longitudinal portion of said core member forming a plurality of hollow fiber longitudinally extending length portions in a plurality of radial layers;
   c. said helically wound hollow fiber member lengths forming a longitudinally extending bundle having an outer peripheral surface and defining an inner surface;
   d. a radial tubesheet surrounding said core member and sealingly engaging a longitudinal portion of each of said longitudinally extending length portions of said hollow fiber member and extending radially inwardly of said inner surface of said bundle forming an inner tubesheet surface and extending radially outwardly from said outer peripheral surface of said bundle forming an outer tubesheet surface;
   e. a manifold bore means extending radially through said core member and said tubesheet to said outer tubesheet surface, the axis of said manifold bore means lying within a first plane which is generally perpendicular to the central axis of said core member;
   f. first collector bore means bored at spaced intervals from said outer tubesheet surface along chords into said tubesheet in a second plane parallel and closely adjacent to said first plane;

g. second collector bore means bored at said spaced intervals from said outer tubesheet surface along chords into said tubesheet in a third plane parallel and closely adjacent to said first plane;
h. a first tributary bore means connecting said manifold bore means and said first collector bore means and the axis of said first tributary bore reans lying generally within said second plane;
i. a second tributary bore means connecting said manifold bore means and said second collector bore means and the axis of said second tributary bore means lying generally within said third plane;
j. said collector bore means have a diameter which is generally 9/16's of the length of said intervals between said first and second collector bore means along said outer tubesheet surface ;
k. the distance between said first and second collector bore means is generally 11/16ths of the length of said intervals between said first and second collector bore means along said outer tube sheet surface; and
l. the diameter of said first manifold bore means is generally equal to or greater than the diameter of said first and second collector bore means.

2. In a hollow fiber permeator as described in claim 1 wherein:
a. said manifold bore means includes first and second manifold bores coaxial to one another and disposed on opposite sides of said hollow core member.

3. In a hollow fiber permeator as described in claim 2 wherein:
a. said first and second collector bore means each include;
(1) a first plurality of collector bores and
(2) a second plurality of collector bores disposed at generally right angles to said first plurality of collector bores.

4. In a hollow fiber permeator as described in claim 3 wherein:
a. each of said first and second tributary bore means includes;
(1) a first tributary bore intersecting a plurality of said first collector bores; and
(2) a second tributary bore intersecting a plurality of said second collector bores.

5. In a hollow fiber permeator as described in claim 4 wherein:
a. said manifold bore means includes third and fourth manifold bores coaxial to one another and disposed on opposite sides of said hollow core member extending along a radius within said tube sheet along said first plane from said outer tubesheet surface and terminating at said inner tube sheet surface and disposed at generally right angles to said first and second manifold bores;
b. said first and second collector bore means each include:
(1) a third plurality of collector bores generally parallel to said first plurality of collector bores disposed on opposite sides of said core member;
(2) a fourth plurality of collector bores generally parallel to said second plurality of collector bores disposed on opposite sides of said core member; and
c. said first and second tributary bore means each include;
(1) a third tributary bore intersecting a plurality of said third collector bores; and
(2) a fourth tributary bore intersecting a plurality of said fourth collector bores.

6. In a hollow fiber permeator as described in claim 5 wherein:
a. said first and second collector bore means are disposed to said manifold bore means at an angle of substantially 45°;
b. said first plurality of collector bores extend from said outer tubesheet surface of said tubesheet to an inner termination point which is first to intersect said inner surface of said bundle, or to intersect and communicate with said first or third manifold bores;
c. said second plurality of collector bores extend from said outer tubesheet surface of said tubesheet to an inner termination point which is first to intersect said inner surface of said bundle, or to intersect and communicate with said third or second manifold bore;
d. said third plurality of collector bores extend from said outer tubesheet surface of said tubesheet to an inner termination point which is first to intersect said inner surface of said bundle, or to intersect and communicate with said second or fourth manifold bore;
e. said fourth plurality of collector bores extend from said outer tubesheet surface of said tubesheeet to an inner termination point which is first to intersect said inner surface of said bundle, or to intersect and communicate with said fourth or first manifold bore; and
f. each of said tributary bores are disposed coaxially with one of said collector bores and intersect adjacent manifold bores.

7. In a hollow fiber permeator separation apparatus as described in claim 6 wherein:
a. each of said first collector bores which intersect said third manifold bore is located so as to intersect one of said second collector bores which intersect said third manifold bore; and
b. each of said first collector bores which intersect said first manifold bore is located so as to intersect one of said fourth collector bores which intersect said first manifold bore.

8. In a hollow fiber permeator separation apparatus as described in claim 1 wherein:
a. said hollow fiber member is helically wound upon said core member at a helix angle varying from approximately 36° to 54°.

9. In a hollow fiber permeator separation apparatus as described in claim 1 wherein:
a. said hollow fiber member is helically wound upon said core member at a helix angle varying from approximately 32° to 90°.

10. In a hollow fiber permeator separation apparatus having a pressurizeable casing, the improvement comprising:
a. an elongated foraminous hollow core member mounted in said casing;
b. a fluid permeable hollow fiber, a plurality of hollow fibers, or a tow of hollow fibers helically wound upon and extending along a longitudinal portion of said core member forming a plurality of hollow fiber longitudinally extending length portions in a plurality of radial layers;
c. said helically wound hollow fiber member lengths forming a longitudinally extending bundle having an outer peripheral surface and defining an inner surface;
d. a radial tubesheet surrounding said core member and sealingly engaging a longitudinal portion of each of said longitudinally extending length portions of said hollow fiber member and extending radially inwardly of said inner surface of said bundle forming an inner tubesheet surface and extending radially outwardly from said outer peripheral surface of said bundle forming an outer tubesheet surface;
e. a slot formed in said outer tubesheet surface;
f. a manifold bore means extending radially through said core member and said tubesheet and communicating with said slot in said outer tubesheet surface, the axis of said manifold bore means lying within a first plane which is generally perpendicular to the central axis of said core member;
g. first collector bore means bored at spaced intervals from said outer tubesheet surface along chords into said tubesheet in a second plane parallel and closely adjacent to said first plane;
h. second collector bore means bored at said spaced intervals from said outer tubesheet surface along chords into said tube sheet in a third plane parallel and closely adjacent to said first plane;
i. a first tributary bore means connecting said manifold bore means and said first collector bore means and the axis of said first tributary bore means lying generally within said second plane;
j. a second tributary bore means connecting said manifold bore means and said second collector bore means and the axis of said second tributary bore means lying generally within said third plane;
k. said collector bore means have a diameter which is generally 9/16's of the length of said intervals between said first and second collector bore means along said outer tubesheet surface;
l. the distance between said first and second collector bore means is generally 11/16ths of the length of said intervals between said first and second collector bore means along said outer tube sheet surface; and
m. the diameter of said first manifold bore means is generally equal to or greater than the diameter of said first and second collector bore means.

* * * * *